C. H. KICKLIGHTER.
METHOD OF ELECTRIC WELDING METAL PLATES.
APPLICATION FILED NOV. 27, 1918.

1,310,419.

Patented July 22, 1919.

INVENTOR
Chas. H. Kicklighter.

UNITED STATES PATENT OFFICE.

CHARLES H. KICKLIGHTER, OF ATLANTA, GEORGIA.

METHOD OF ELECTRIC WELDING METAL PLATES.

1,310,419.     Specification of Letters Patent.     Patented July 22, 1919.

Application filed November 27, 1918. Serial No. 264,475.

*To all whom it may concern:*

Be it known that I, CHARLES H. KICKLIGHTER, a citizen of the United States, resident at Atlanta, in the county of Fulton and State of Georgia, have invented new and useful Improvements in Methods of Electric Welding Metal Plates, of which the following is a specification.

The invention relates to a method of making a joint or seam between heavy commercial plates or pieces of metal by the use of intermediate metallic bodies, which are electrically welded to both of the two pieces and are softened and forced into depressions in one or the other of the pieces so as to allow the faces of the two pieces to come into immediate contact.

The object of the present invention is to afford an easy, simple and practical method of forming a highly efficient and tight joint or seam between metallic plates by the electric welding process. The ease of handling the parts and carrying on the process is promoted by previously sticking the intermediate bodies to the bottoms of their respective depressions so as to hold them in a central position during the operation. This sticking is done by fusing at one or more small projecting points only of the contacting surfaces. The efficiency of the joint has been greatly increased by cutting the depressions from each of the plates near its edge where the stresses have been partially removed, by previously being transferred to the other plate. The joint is rendered tight against leakage by having a wire, small bar or strip welded to and forced into a continuous groove running longitudinally along the joint, preferably between the rows of depressions.

I have employed flat disks, as I have found that best results are obtained in the electric welding of heavy commercial stock by having the areas of initial contact substantially the same as the areas of desired weld and of applying the pressure normal to these surfaces. The surfaces of contact are thereby brought to a welding heat at all points at about the same instant and a thorough fusion of the metals at all points is obtained by the time the intermediate metal is softened sufficiently to be forced into conformity with the depression.

Figure 1:
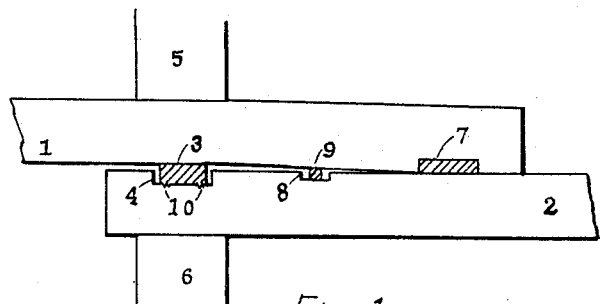
Figure 1 is a diagrammatic sketch, partially sectioned, showing one application of the present invention.
Figure 2:
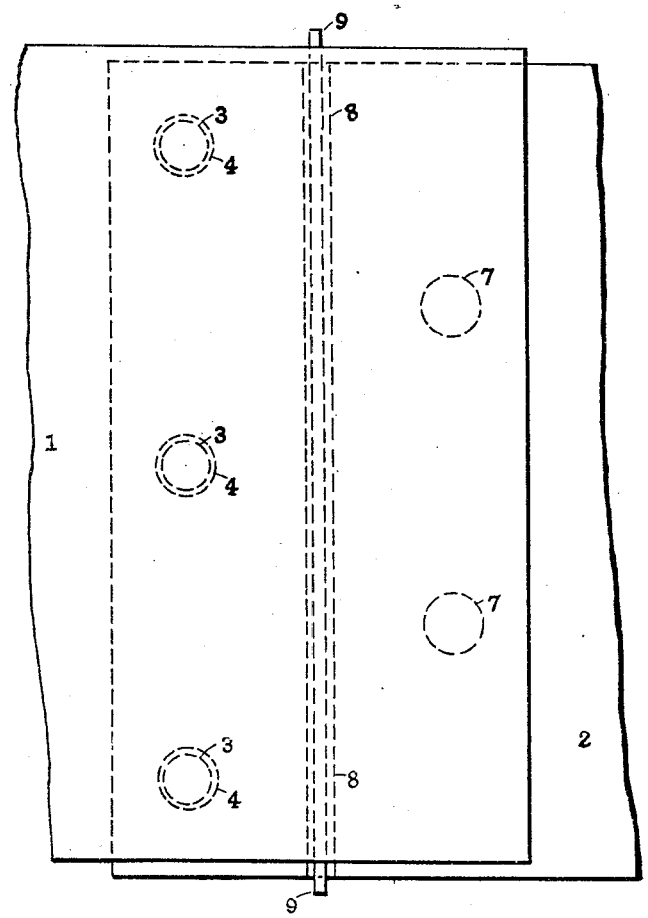
Fig. 2 is a top view of the plates of Fig. 1 with the welding terminals omitted.

Referring to Figs. 1 and 2, the plates or pieces of metal 1 and 2 are to be fastened together. The circular disks 3, flat and rather thin rest in the flat depressions cavities or voids 4 of plate 2 and their projecting portions are in contact with the face of plate 1. The pressure terminal blocks 5 and 6 are adapted to be pressed upon the plates on directly opposite sides of the disks 3. By means of these blocks the assembled parts may be subjected to mechanical pressure, and at the same time to a heavy electric welding current. These blocks may be the terminals of the secondary circuit of an electric welding machine, the construction of which is well known in the art and a description of which it is not thought necessary herein to give. Upon the application of pressure and the welding electric current, the contacting parts are welded together and the disks 3 are softened and forced downward into the depressions or voids 4 so as to allow the plates to come into immediate contact. The position and shape of the disks after the welding operation are shown at 7.

In a small shallow groove 8 is laid a wire or strip 9 running longitudinally with the seam and preferably between the rows of welded portions. This wire or strip is welded to the contacting surfaces, is softened and forced down into the groove by the application of welding pressure terminals or rollers in a manner similar to that described in the case of the disks. At 10—10 is shown the points where the disks 3 are previously fused sufficiently to the bottoms of the depressions to hold them firmly in place and to prevent them from slipping out of their central positions during the arrangement of the work or the welding operation.

Figure 3:
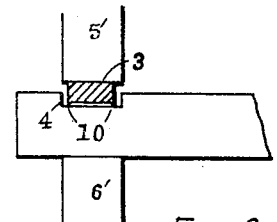
Fig. 3 is a diagrammatic sketch, partially sectioned, showing the preliminary fastening of a disk to the bottom of a depression.

Fig. 3 illustrates this preliminary operation in which at two or more points 10 the edges of a disk 3 are peened over so as to give slight projections. The disk being placed in the proper position in depression 4 two electric terminals 5' and 6' are pressed one upon and the other below the disk 3 so as to fuse the peened edge points only to the bottom of the depression.

The wire 9 is fused into the groove 8 to make the joint water tight, steam tight or air tight as may be desired, without the necessity of mechanical corking. The disks 3 are thoroughly welded to both plates and compressed into the depressions 4 to transfer the stresses from the one plate to the other and to provide strength to the seam. The depressions 4 are cut in each plate near its edges, and the plates are then overlapped so that these depressions fall beyond each other, because any slight weakening of the plates due to cutting the depressions will not then affect the strength of the joint. For, it will be apparent that about half the stress in plate 1 will be transferred to plate 2 at the depressions in plate 2 where plate 1 is solid and of undiminished strength, and vice versa.

The seam described is highly efficient, being as strong as the solid metal plates, it is tight and proof against leakage, and it is practical and easy to make on account of the provision for holding the disks in their proper places in the depressions during the arrangement of the work and the welding operation.

The operation is apparent. After the preparation of the parts by making depressions in the surfaces of the plates and a groove in the surface of one of them, after fusing the peened edge-points of the disks to the bottoms of the depressions so as to hold them correctly therein the parts are brought into the proper juxtaposition with the plate surfaces having the depressions overlapping and falling beyond each other, and with a wire in the groove between the plates. The assembled parts are then subjected to pressure and heating electric current by the application of pressure terminal blocks or rolls. The intermediate metallic bodies are welded to both plates and are, at the same time softened and forced into the depressions and groove so as to permit the faces of the plates to come into immediate contact.

What I claim is:

1. The method of fastening two metal plates together, face to face, which consists of forming flat bottom depressions in the faces of the plates near the edges thereof, of forming a groove in the face of one of the plates to one side of the depressions at a location where before being reached a portion of the stresses in said plate will have been transferred to the other plate, of introducing into the depressions substantially flat metallic bodies of sufficient thickness to hold the plates apart during the welding operation, of fusing the metallic bodies to the bottoms of the depressions at a point or points only sufficiently to hold them in place during the subsequent adjusting and welding operation, of bringing the plates into juxtaposition so that the depressions in the plates fall beyond each other relative to the major portions of the respective plates, and with a wire in the groove and the plate surfaces contacting with the projecting portions of the metallic bodies, of welding the metallic bodies and the wire to both of the plates by the application of pressure and heating electric current and of forcing the metallic bodies and the wire into the depressions and groove so as to allow the plates to come into immediate contact.

2. The method of fastening two metal plates together, face to face, which consists of forming voids in the faces of the plates near the edges thereof, of forming a groove in the face of one of the plates to one side of the depressions therein, of fastening in the voids metallic bodies of sufficient thickness to hold the plates apart during the welding operation, of introducing a wire in the groove, of bringing the plates into juxtaposition with the edges overlapping and the depressions falling beyond each other so that when the joint is completed the stresses in one plate may be partially transferred to the other plate before a location is reached where the first plate has been weakened by the forming of voids or the groove, and by the application of pressure and heating electric current, of fusing the wire to and thoroughly welding the metallic bodies to both metal plates.

3. The method of fastening two thick plates of metal together, face to face, which consists in forming flat bottom depressions in the faces of the plates of less depth than the thickness of the plates in which they are formed, inserting in said depressions metallic bodies having substantially parallel flat top and bottom faces of sufficient thickness to hold the opposing faces of the plates apart during the welding operation, in bringing the plates into juxtaposition so that the depressions in the first plate fall beyond the depressions of the second plate from the major part of said first plate, and by the application of pressure and heating electric current of welding the opposite parallel faces of said metallic bodies to the bottom of depressions in one plate and to the plain surface of the other plate and of heating the metallic bodies so that they soften and occupy the depressions allowing the plates of metal to be forced into immediate contact.

4. The method of fastening two metal plates together, face to face, which consists of forming depressions in the faces of the plates near the edges thereof and a groove in the face of one of the plates, of introducing metallic bodies into said depressions and a wire or strip into said groove of sufficient thickness to hold the plates apart during the welding operation, of bringing the plates into juxtaposition so that the groove lies between the positions of the depressions in the one plate and those in the other plate, and by the application of pressure and heating electric current of welding the metallic bodies and wire to both of the plates and forcing them into the depressions and groove until the plates come into immediate contact.

5. The method of fastening two metal plates together, face to face, which consists of forming flat bottom depressions in the faces of the plates near the edges thereof, of forming a groove in the face of one of the plates to one side of the depressions therein at a location where a portion only of the stresses in the plates exist, of introducing flat metallic bodies into said depressions and a wire or strip into said groove of sufficient thickness to hold the plates apart during the welding operation, of bringing the plates into juxtaposition, and by the application of pressure and heating electric current of welding the metallic bodies to both of the plates and forcing them into the depressions and the wire into the groove until the plates come into immediate contact.

6. The method of fastening two plates of metal together, face to face, which consists of forming depressions in the faces of the plates, of fusing metallic bodies to the bottoms of the depressions at points only sufficiently to hold them in place during the subsequent handling and welding operation, of bringing the plates into juxtaposition so as to contact with the projecting portions of said metallic bodies and by the application of pressure and heating electric current of welding the metallic bodies thoroughly to both plates.

7. The method of fastening two thick plates of metal together, face to face, which consists of forming flat bottom depressions in the faces of the plates, of introducing into said depressions and fastening therein substantially flat metallic bodies of sufficient thickness to hold the plates apart during the wolding operation, and by the application of pressure and heating electric current of welding the metallic bodies thoroughly to both plates and forcing them into the depressions until the plates come into immediate contact.

8. The method of fastening two plates of metal together, face to face, which consists of forming voids in the face of one of the plates, of introducing into said voids metallic bodies and fastening them sufficiently therein to hold in place during the subsequent handling and welding operation, of bringing the plates into juxtaposition so as to contact with the projecting portions of said metallic bodies and by the application of pressure and heating electric current of welding the metallic bodies thoroughly to both plates.

In testimony whereof, I have hereunto signed my name in the presence of two subscribing witnesses at San Antonio in the county of Bexar and State of Texas this 23d day of November, 1918.

CHARLES H. KICKLIGHTER.

Witnesses:
A. GIBBS,
L. T. BALDWIN.